(12) United States Patent
Andersson et al.

(10) Patent No.: US 6,413,199 B1
(45) Date of Patent: Jul. 2, 2002

(54) METHOD OF MANUFACTURING EDGE-SEALED PACKAGING CONTAINER BLANKS

(75) Inventors: Ingvar Andersson; Thomas Pettersson, both of Löddeköpinge (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 09/554,260
(22) PCT Filed: Nov. 11, 1998
(86) PCT No.: PCT/SE98/02033
   § 371 (c)(1),
   (2), (4) Date: Jul. 25, 2000
(87) PCT Pub. No.: WO99/25548
   PCT Pub. Date: May 27, 1999

(30) Foreign Application Priority Data

Nov. 13, 1997 (SE) .............................................. 9704157

(51) Int. Cl.[7] .................................................. B31B 1/60
(52) U.S. Cl. ........................ 493/210; 493/231; 493/374
(58) Field of Search ................................ 156/217, 218, 156/258; 493/210, 231, 242, 374, 380, 397

(56) References Cited

U.S. PATENT DOCUMENTS

| | | | |
|---|---|---|---|
| 2,160,221 A | * | 5/1939 | Masters et al. |
| 3,553,048 A | * | 1/1971 | Ryan |
| 3,992,841 A | * | 11/1976 | Ward, Jr. |
| 4,080,235 A | | 3/1978 | Mandersson |
| 4,240,855 A | * | 12/1980 | Pennigton |
| 4,256,791 A | | 3/1981 | Holmström et al. |
| 4,511,078 A | | 4/1985 | Rausér et al. |
| 5,093,176 A | | 3/1992 | Pribonic et al. |
| 5,326,411 A | * | 7/1994 | Arnold |

FOREIGN PATENT DOCUMENTS

| | | |
|---|---|---|
| EP | 0413118 | 2/1991 |
| SE | 390196 | 11/1975 |

* cited by examiner

*Primary Examiner*—Eugene Kim
(74) *Attorney, Agent, or Firm*—Burns, Doane, Swecker & Mathis, L.L.P.

(57) ABSTRACT

The invention relates to a method of manufacturing edge-sealed packaging container blanks. The manufacturing process starts from a continuous material web with an outside layer and an inside, the inside layer extending outside the one edge of the web and formign a fixed strip.

5 Claims, 3 Drawing Sheets

METHOD OF MANUFACTURING EDGE-SEALED PACKAGING CONTAINER BLANKS

TECHNICAL FIELD

The present invention relates to a method of manufacturing edge-sealed packaging container blanks starting from a continuous material web with an outside- and an inside layer, the inside layer extending outside the one edge of the web, for the formation of a fixed strip, the strip being folded over the edge of the web and sealed to the outside layer.

BACKGROUND ART

A common type of package or carton for liquid of the single-use disposable type is that which is manufactured from a packaging laminate with a core layer of paper or paperboard to which are laminated different thermoplastic layers. Such packages for liquids may be manufactured both directly from a continuous material web and from cut material sheets. The present invention relates to packaging container blanks manufactured from a material sheet, for which reason only the handling of such blanks will be described in this specification.

The material sheet is sealed with a longitudinal joint seal for the formation of a sleeve. The sleeve is formed at its one end into a top or alternatively into a bottom of the package and is filled with the intended contents. Thereafter, the remaining end of the sleeve is formed into the bottom or the top, respectively, of the package. The sleeve may be formed into a parallelepipedic package or alternatively into a package with a gable top portion.

Before the packaging material is formed and filled with the intended contents, an operation is carefully carried out to ensure that the edge or edges of the sheet which come into contact with the contents of the package are protected in order that the core layer of paper or paperboard will not be able to suck up the enclosed liquid and thereby destroy the package. In the manufacture of packaging container blanks from material sheets, it has been necessary, in order to obtain an edge protected by plastic material, to carry out a "slicing process", i.e. a part of the core layer is milled off in order that the thus thinned portion of the sheet can be folded to form an edge protection. "Slicing" is a relatively costly and precision-demanding process.

However, the outer edges of the finished single-use package which are not in contact with the contents of the package are still unprotected, and the core layer can, on outer contact with liquid, absorb such liquid by suction. For single-use packages of the above-outlined type which are greatly exposed to liquid or whose handling requires an extra level of stability, it may be necessary to protect all edges of the sheet which is to constitute the packaging container blank.

OBJECT OF THE INVENTION

One object of the present invention is to realise a method of manufacturing a packaging container blank with all edges protected by a plastic layer. This method may be reduced into practice continuously from a web-shaped prefabricated material to a finished, edge-protected packaging container blank.

SOLUTION

This and other objects have been attained according to the present invention in that the method of the type disclosed by way of introduction has been given the characterizing features that the web is thereafter cut into sheets, which are advanced with a certain spacing between the sheets, the sheets being laminated to two continuous plastic foil webs, one outer and one inner, each foil web extending outside one edge of the sheets, for the formation of two strips, the strips which extend outside the edges being folded and sealed around each edge, the sheets being once again cut from one another centrally between two sheets and turned through 90° in relation to the direction of the web, the strips formed in the interspace and consisting of the outer and inner plastic foil webs being thereafter folded over the second and fourth edges of the sheet towards the inside of the sheet, the sheet being once again turned through 90° in relation to the direction of the web, and the sheet being finally folded together and longitudinally joint sealed.

Preferred embodiments of the present invention have further been given the characterizing features as set forth in the appended subclaims.

BRIEF DESCRIPTION OF THE ACCOMPANYING DRAWINGS

One preferred embodiment of the present invention will now be described in greater detail hereinbelow, with particular reference to the accompanying Drawings, in which.

DESCRIPTION OF PREFERRED EMBODIMENT

Figure 1:
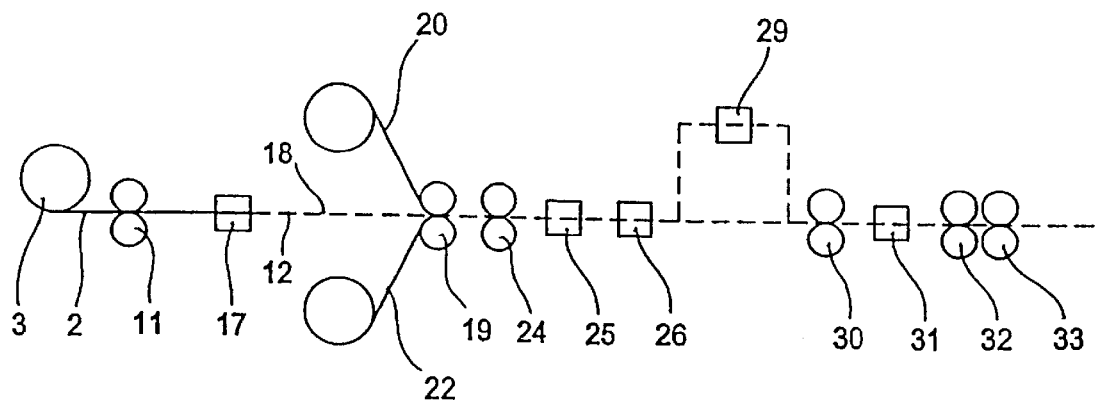
FIG. 1 shows a flow diagram of the method of manufacture.
Figure 2:
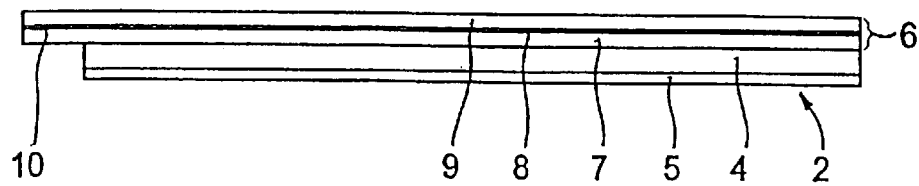
FIGS. 2 to 8 show different side elevations, partly in section, of the packaging material at various stages in the manufacturing process.

The manufacture of a packaging container blank 1 according to the present invention takes as its starting point a prefabricated material web 2 of the type which is often employed in the packaging industry for the manufacture of single-use disposable packages starting from a continuous material web. The prefabricated material web 2 which, in FIG. 1, is shown as a magazine reel 3, is illustrated in section in FIG. 2. The material web 2 has a core layer 4 of paper or paperboard. To the outer side of the core layer 4, there is laminated a thermoplastic layer 5, such as, for example, PE (polyethylene). The inner side of the core layer is laminated with a barrier layer 6 which may either be a PE layer or a layer 6 as in FIG. 2, consisting of a PE layer 7, an aluminium foil layer 8 and an additional PE layer 9.

The inner barrier layer 6 is laminated to the material web 2 such that a part of the barrier layer 6 extends outside the edge of the web 2 and forms a fixed strip 10. This is put into effect in that a wide material web is divided lengthwise into narrower part webs 2 which are advanced in parallel and in a certain spaced apart relationship to one another. The separated, parallel webs 2 are laminated with a blanket covering barrier layer 6 over the total width of all of the part webs. The blanket barrier layer 6 is then cut along the one longitudinal edge of each respective part web 2 so that each part web 2 has a projecting strip 10 of the barrier layer 6. This method of providing a material web 2 with a fixed, longitudinal strip 10 is described in Swedish Patent Specification SE 380 196.

Figure 3:
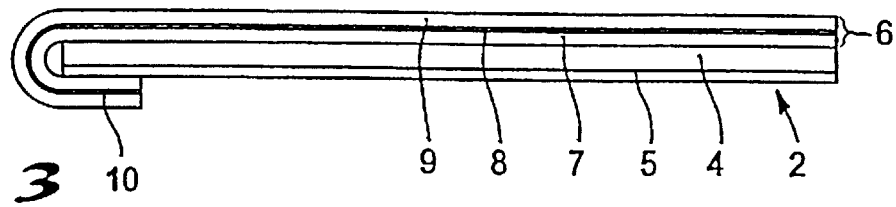

The fixed strip 10 is folded around the edge of the material web 2 and is sealed against the outside layer 5. This operation takes place in workstation 11 in the flow diagram in FIG. 1. The material web 2 will thus have an appearance in section as shown in FIG. 3. All of the plastic layers applied on the core layer 4 using this method are extremely thin in relation to the core layer 4, for which reason the Drawing FIGS. 2 to 8 cannot be considered as dimensionally correct and true to scale.

Thereafter, the material web 2 is divided into material sheets 12 of equal size. A material sheet 12 thus consists of a rectangular part of the material web 2, with four edges 13, 14, 15 and 16. The first edge 13 is already edge-sealed by the folding over of the fixed strip 10. The division of the material web 2 into material sheets 12 takes place in workstation 17. The material sheets 12 are now advanced through the manufacturing process with a certain interspace 18 between each other. In workstation 17, a creasing of the material sheets 12 may suitably also be carried out, i.e. the sheets 12 are, by means of creasing tool, provided with folding lines in order that the sheet 12 may, later in the process, more easily be folded into a finished packaging container.

The material sheets 12 disposed with interspaces 18 between each other are laminated in workstation 19 into a continuous plastic foil web 20 constituting an inside layer 21 and another continuous plastic foil web 22 constituting an outside layer 23. The inside layer 21 preferably consists of a PE film. The plastic foil web 22 may consist of an oriented polypropylene OPP. The outside layer 23 may be a film which is printed or unprinted, the film may also be coloured or metallised. Applying a pre-printed outside layer 23 has advantages for maintaining register, since it is easier to adapt the pre-printed decorative artwork pattern in relation to the fold lines, since the material sheets 12 may become displaced slightly in relation to one another and in relation to the outside plastic foil web 22 provided with decorative artwork.

Figure 4:
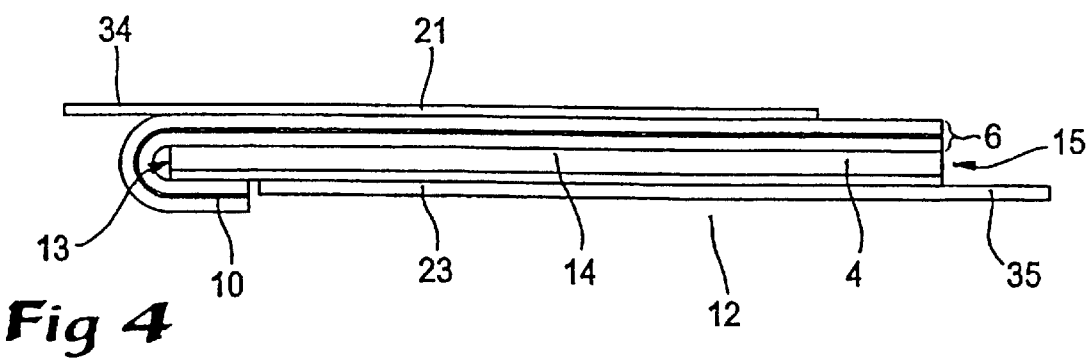
Figure 5:
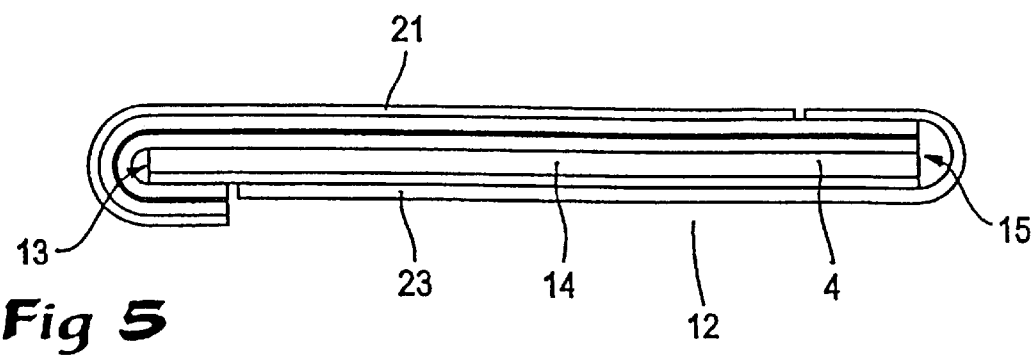

Both of the plastic foil webs 20, 22 are applied offset in relation to the material sheets 12 and in relation to one another, so that the inside layer 21 extends outside the first edge 13 of the sheet, for the formation of a strip 34, and that the outside layer 23 extends outside the third edge 15 of the material sheet, for the formation of a strip 35 as shown in FIG. 4. In workstation 24, the two strips 34, 35 consisting of the layers 21, 23, are folded around each respective edge 13 and 15. The material sheet 12 will now have the appearance in section as shown in FIG. 5. Two of the edges 13, 15 of the material sheet 12 are thereby sealed and protected by means of a surrounding plastic layer.

Figure 6:
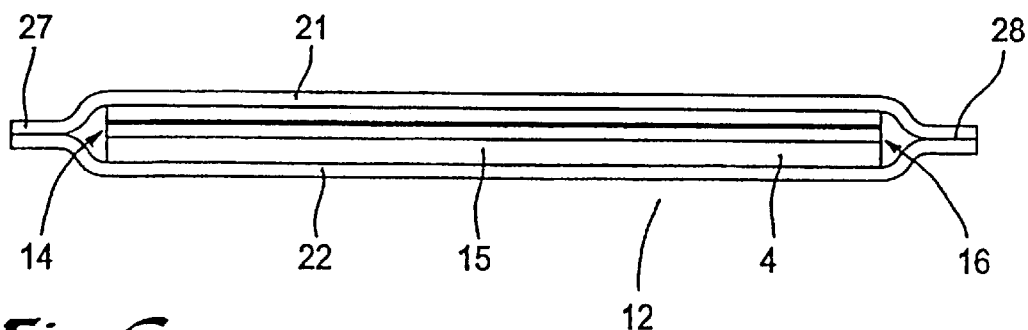

In workstation 25, the web which consists of the two plastic films 20, 22, and material sheet 12 encapsulated in plastic between the film webs 20, 22 is once again divided into individual material sheets 12. In the next workstation 26, the material sheets 12 are turned through 90° in relation to the direction of the web. FIG. 6 shows, in section, a material sheet 12 which has been turned through 90°.

When the material sheet in the workstation 25 has once again been severed from its neighbours, this severing takes place centrally in the interspace 18 between the material sheets 12. As a result, two strips 27 and 28 are created which extend outside the second 14 and the fourth 16 edges of the material sheet 12. Both of the plastic foil webs 20, 22 may have been sealed to one another before being severed in the workstation 25, or alternatively the webs 20, 22 may be loose and free in relation to one another. In the severing operation, there will be a certain adhesion between the film webs 20, 22 regardless of whether they were sealed to one another previously or not.

The material sheets 12 may, in this position, possibly be given printed decorative artwork in workstation 29. A printing operation at this late stage in the manufacturing process of the packaging container blanks 1 may be of advantage for customers with small order series or for customers who wish to switch decorative artwork often. At this stage, it is possible to print decorative artwork for which no register maintenance is required.

Figure 7:
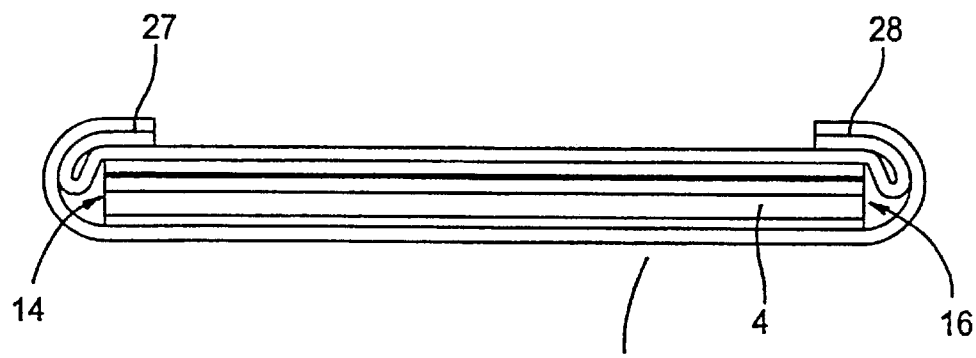
Figure 8:
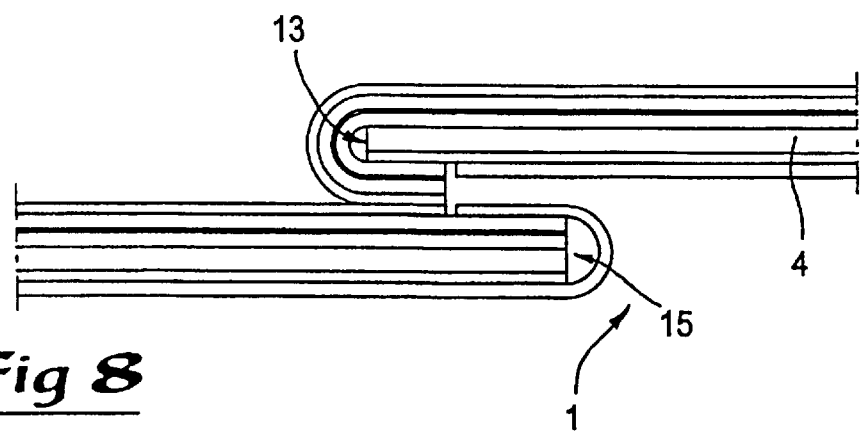

Thereafter, the strips 27, 28 are folded over each respective edge 14, 16 towards the inside of the material sheet 12, which is carried out in workstation 30. The material sheet 12 has now an appearance in section which is shown in FIG. 7. At this phase, the material sheet 12 has all four edges 13, 14, 15 and 16 sealed with a covering and protective plastic layer.

The material sheets 12 are once again turned through 90° in relation to the direction of the web, which is carried out in workstation 31. The now edge-sealed material sheet 12 is folded in the prefabricated fold lines in workstation 32 and finally in workstation 33 the material sheet 12 is longitudinally joint sealed to form a finished sleeve, a finished packaging container blank 1. The longitudinal joint sealing takes place by means of a superjacent joint at the first edge 13 and third edge 15 of the material sheet. The longitudinal joint seal is shown in section in FIG. 8.

As will have been apparent from the foregoing description, the present invention realises a method for sealing all four edges of a material sheet in a continuous process for obtaining a packaging container blank which receives efficient protection against surrounding moisture when the finished packages are exposed under unfavourable conditions. The method according to the present invention also makes for the manufacture of packaging container blanks with increased stability. Finally, the method according to the present invention also eliminates the need for the costly "slicing process".

The present invention should not be considered as restricted to that described above and shown on the Drawings, many modifications being conceivable without departing from the scope of the appended Claims.

What is claimed is:

1. A method of manufacturing edge-sealed packaging container blanks (1) starting from a continuous material web (2) with an outside (5) and an inside (6) layer, said inside layer (6) extending outside the one edge (13) of the web (2), for the formation of a fixed strip (10), said strip (10) being folded over the edge (13) of the web (2) and sealed to the outside layer (5), characterized in that the web (2) is thereafter cut into sheets (12) which are advanced with a certain interspace (18) between the sheets (12), said sheets (12) being laminated to two continuous plastic foil webs (20, 22), one outer (22) and one inner (20) web, each foil web (20, 22) extending outside one edge (13, 15) of the sheets (12), for the formation of two strips (34, 35), said strips (34, 35) extending outside the edges (13, 15) being each folded and sealed around an edge (13, 15), said sheets (12) being once again severed from one another centrally between two sheets (12) and turned through 90° in relation to the direction of the web, the strips (27, 28) formed in the interspace (18) and consisting of the outer (22) and inner (20) plastic foil webs being thereafter folded over the second (14) and fourth (16) edges of the sheet (12) towards the inside of the sheet (12), the sheet (12) being once again turned through 90° in relation to the direction of the web, and said sheet (12) being finally folded together and longitudinally joint sealed.

2. The method as claimed in claim 1, characterized in that the outer plastic foil web (22) is pre-printed.

3. The method as claimed in claim 1, characterized in that the outer plastic foil web (22) is coloured in.

4. The method as claimed in claim 1, characterized in that the outer plastic foil web (22) is metallised.

5. The method as claimed in claim 1, characterized in that the outer plastic foil web (22) is unprinted; and that the outside of the packaging container blank (1) is provided with decorative artwork in the workstation (29) after the sheets (12) have been separated from one another a second time.

* * * * *